United States Patent [19]

Siedhoff

[11] Patent Number: 4,782,856
[45] Date of Patent: Nov. 8, 1988

[54] MODULATING FLOW CONTROL VALVE
[75] Inventor: George H. Siedhoff, Wichita, Kans.
[73] Assignee: Gordon-Piatt Energy Group, Inc., Winfield, Kans.
[21] Appl. No.: 38,878
[22] Filed: Apr. 15, 1987
[51] Int. Cl.⁴ .................... F16K 37/00; F16K 31/524
[52] U.S. Cl. .............. 137/556.3; 251/129.11; 251/251; 251/263; 251/285; 251/360; 251/903
[58] Field of Search .............. 137/556.3; 251/129.11, 251/251, 262, 263, 285, 360, 903; 74/568 R

[56] References Cited
U.S. PATENT DOCUMENTS

| | | |
|---|---|---|
| 665,083 | 1/1901 | Friedmann . |
| 733,693 | 7/1903 | Bladon . |
| 1,055,152 | 3/1913 | Erickson . |
| 1,525,052 | 2/1925 | Spotz . |
| 1,589,934 | 6/1926 | Borchardt ................... 251/263 X |
| 1,619,937 | 3/1927 | Huff . |
| 1,698,826 | 1/1929 | Shaffer ........................ 137/556.3 |
| 1,750,537 | 3/1930 | Murray ....................... 251/263 |
| 1,799,143 | 4/1931 | Bailey ......................... 137/556.3 |
| 2,051,307 | 8/1936 | Lorraine ..................... 137/556.3 X |
| 2,275,624 | 3/1942 | Hann ........................... 251/263 X |
| 2,286,173 | 6/1942 | Maxon ......................... 277/3 |
| 2,315,171 | 3/1943 | Voorheis ..................... 251/132 |
| 2,323,737 | 7/1943 | Tritle .......................... 74/568 |
| 2,505,106 | 4/1950 | Finch et al. ................. 251/263 X |
| 2,531,479 | 11/1950 | Southern et al. ............ 251/903 X |
| 2,980,392 | 4/1961 | Greenwood ................. 251/903 X |
| 3,183,926 | 5/1965 | Boudot ........................ 137/556.3 X |
| 3,187,775 | 6/1965 | Pinnell ........................ 137/625.3 |
| 3,706,438 | 12/1972 | Condon et al. ............. 251/251 |
| 4,542,766 | 9/1985 | Gawer et al. ............... 137/559 |
| 4,568,499 | 2/1986 | Wood .......................... 261/41 |

Primary Examiner—John Rivell
Attorney, Agent, or Firm—Bill D. McCarthy

[57] ABSTRACT

A modulating flow control valve comprising a central valve body with a tubular body member detachably supported at an inlet port thereof and providing a valve seat; a plug member is detachably supported in an access bore of the central valve body; and a valve stem, biased toward the valve seat, is extensive through a bore in the plug member. A valve seating member is supportable by a spring stop portion of the valve stem, and with spring biasing of the valve stem, is urged in restricting or sealing relationship with the valve seat, the valve seating member having a valve seating portion of a selected diameter to permit a predetermined maximum flow rate through the valve seat. A stem modulator assembly is provided to move the valve stem in response to a characterizing linkage assembly. Valve setting is provided by an indicia plate and an indicator pin supported by the valve stem.

6 Claims, 4 Drawing Sheets

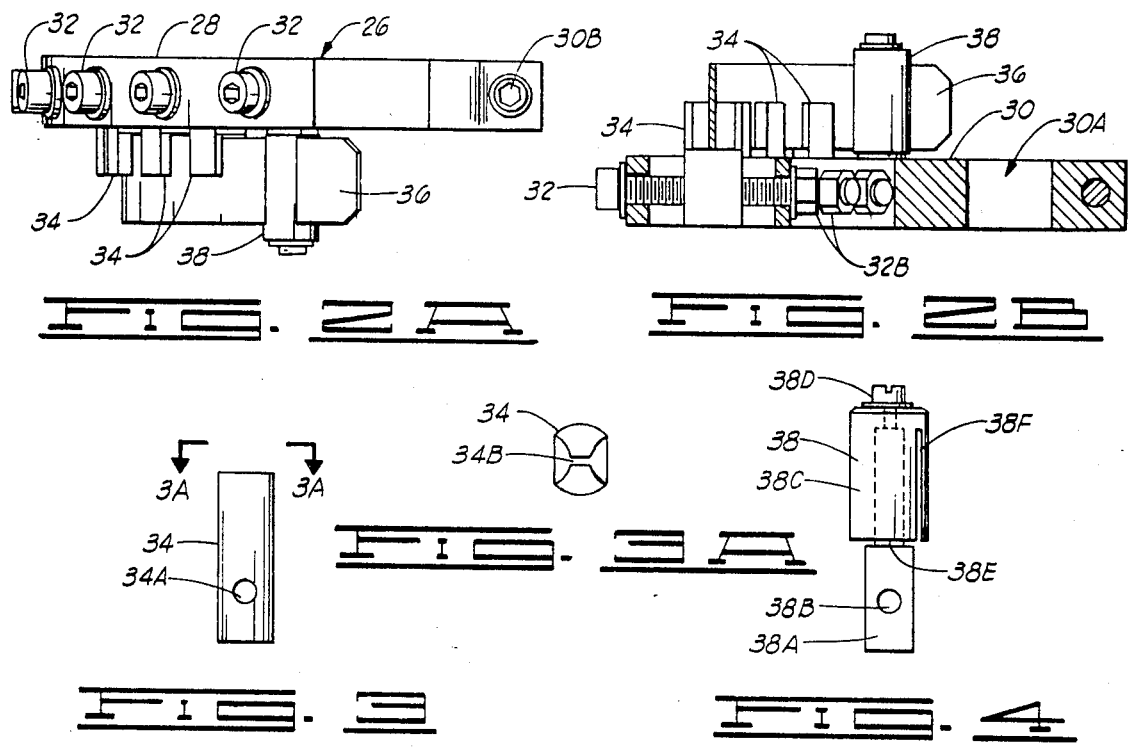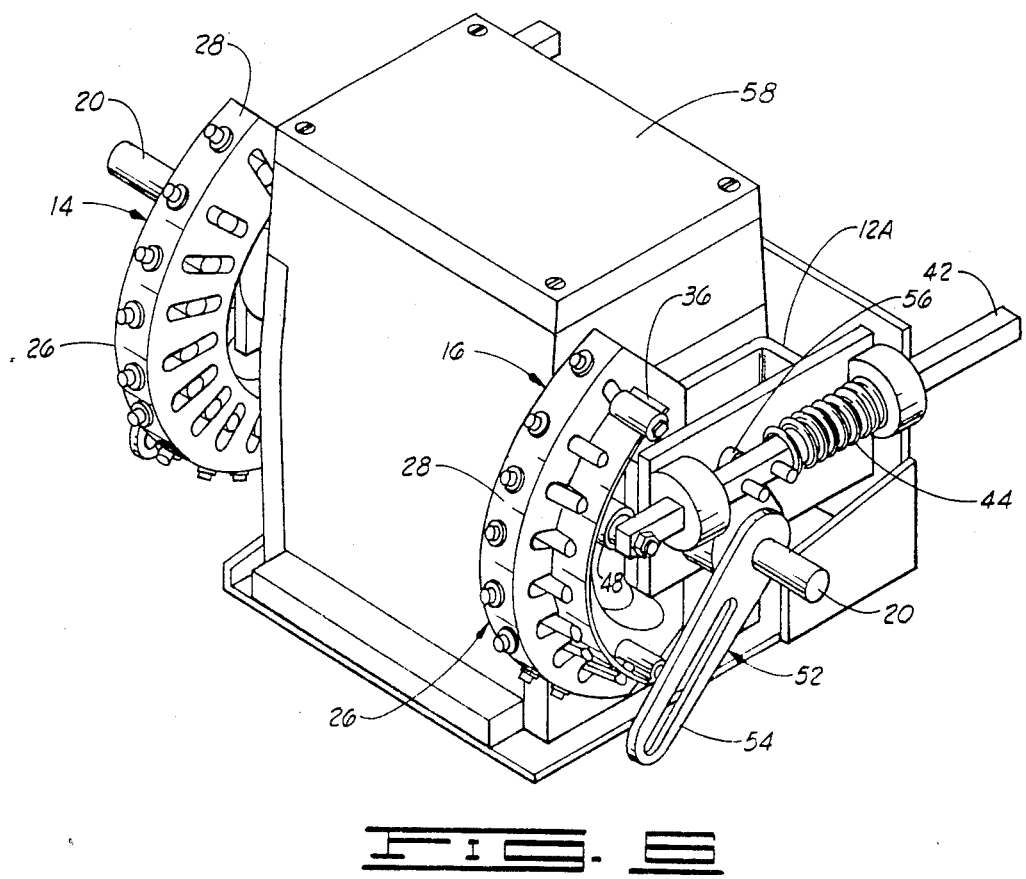

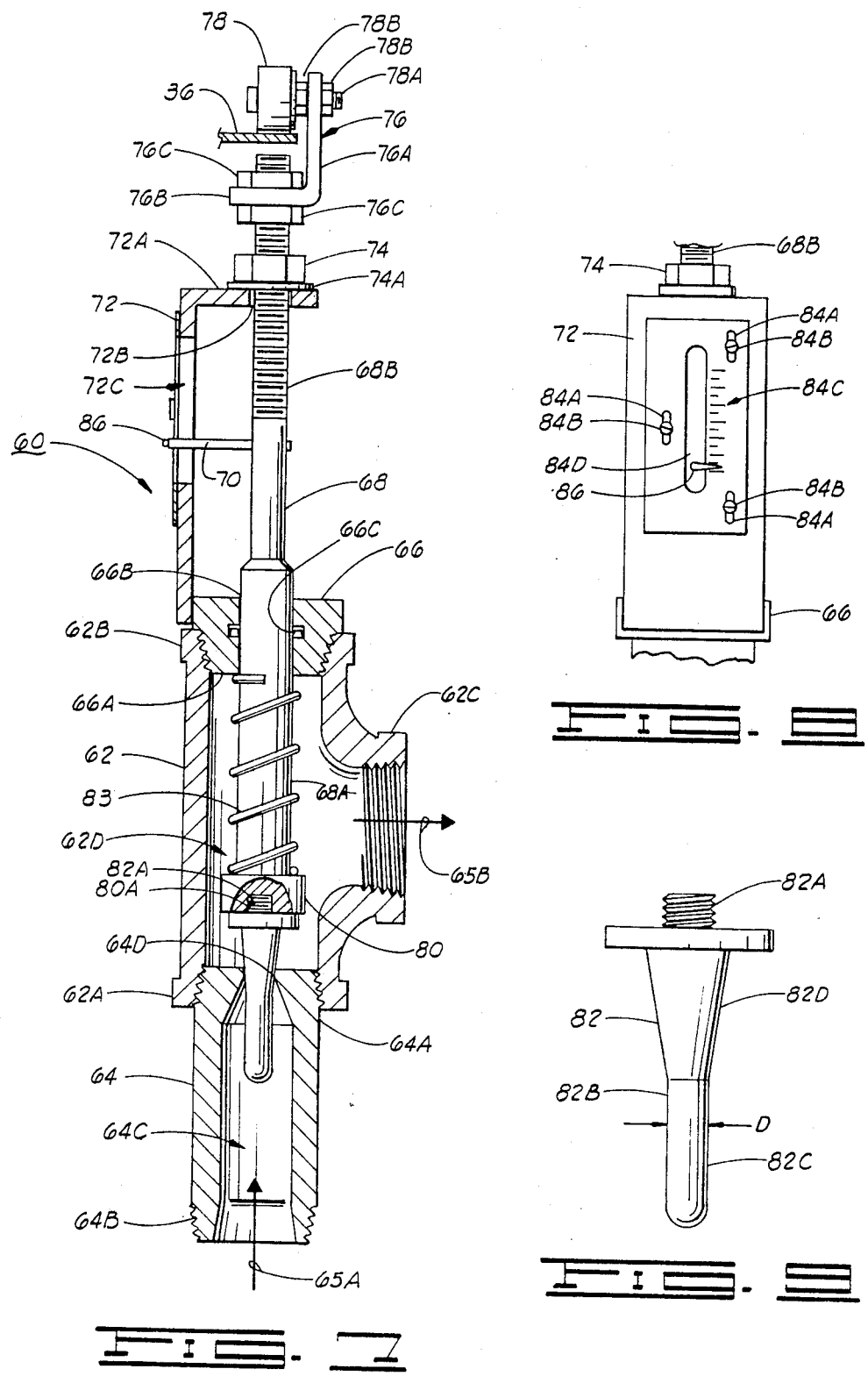

MODULATING FLOW CONTROL VALVE

BACKGROUND OF THE INVENTION

1. Field of the Invention

The present invention relates to the field of fluid flow valves, and more particularly but not by way of limitation, to an improved modulating flow control valve for proportioning the flow of fluids in response to motor controls.

2. Discussion

In the control of fuel to industrial furnaces, boilers and the like, there is a need to maintain proper flow of the fuel over widely varying firing conditions. A number of prior art devices are known for varying inlet fuel valving and inlet air venting in response to monitored signals, such as temperature and stoichiometric parameters. For example, monitors are used to determine the free oxygen content of a stack gas and to trim the inlet air as the monitored reading varies from a set point.

As pointed out in numerous prior art publications, and as is known by persons of ordinary skill in this field, an industrial burner application will have variables which take each such installation beyond the range of prediction, thus requiring that each installation be provided the capability of tailoring its characterizing controls to its peculiarities over the range of its firing usage. Several prior art characterizing or proportioning control teachings are provided in the following prior art teachings.

Maxon, U.S. Pat. No. 2,286,173, teaches a valve to proportion air and fuel to industrial burner systems in which an air gate is journaled in an air passage bore and is rotatable by a segmetal arm structure. A spring loaded stemmed valve (biased closed) is supported in a fuel inlet bore. A push rod is supported to engage the stemmed valve and is operable to open same as it is pressed against the stemmed valve. Actuating means is disposed to actuate the push rod by the arm structure which supports a series of individually adjustable threaded pins carried by the arm structure to variably depress the push rod along the arc of the arm structure to vary the air-fuel ratio. A flexible strip is disposed between the push rod and the threaded pins to facilitate engagement therewith.

Voorheis, U.S. Pat. No. 2,315,171 teaches an adjustable valve in which a series of adjusting screws provide a path to selectively depress a roller supported by an operating handle connected to a valve rod which is spring biased. Thus the object of the invention, to move the valve control element through a predetermined sequence of valve settings, is achieved.

Condon et al, U.S. Pat. No. 3,706,438, teaches an operating mechanism for controlling movement of a valve element. A continuous deformable channel has a pair of opposed cam surfaces supported by adjusting screw and a support member. A follower is connected to a shaft which moves a valve element between open and closed positions. Spotz, U.S. Pat. No. 1,525,052, teaches an adjustable cam surface and a cam follower. The shape of the cam surface is determined by a plurality of adjustable struts which connect it to a carrying frame. Tritle, U.S. Pat. No. 2,323,737, teaches a control system having a cam that is mounted for pivoting on a pin and which sections may be adjusted by means of screws.

Valves for fuel oil flow are numerous in design, and more specifically, the above mentioned prior art teachings show some of these modulating flow control devices. Variable flow in a valve body can be achieved by tapered valve members, such as taught in the patents issued to: Friedmann, U.S. Pat. No. 665,083; Huff, U.S. Pat. No. 1,619,937; Bladon, U.S. Pat. No. 733,693; Pinnell, U.S. Pat. No. 3,187,775; Wood, U.S. Pat. No. 4,568,499; Gawer et al, U.S. Pat. No. 4,542,766; and Erickson, U.S. Pat. No. 1,055,152. While not exhaustive, this list provides illustrative art of various approaches to variable flow control.

None of these prior art control devices provide the advantages and the novel structure of the present invention as described herein.

SUMMARY OF THE INVENTION

The present invention provides an improved flow control valve of the type that has the capability of being modulated in response to a characterizing linkage assembly or the like, or which can be used with a manual setting over selected and determinable ranges.

The flow control valve of the present invention has a central valve body with an inlet port, an outlet port and a body access port. A tubular body member is detachably supported in the inlet port and supports a valve seat. A plug member with a centrally disposed bore therethrough is detachably supported in the access bore; a support plate extends from the plug member and having a stem stop portion with a stem clearance bore.

A valve stem member extends through the plug member bore and the stem clearance bore, an upper end portion of the valve stem being threaded. A valve seating member is removably supported by a spring stop portion of the valve stem within the internal hollow of the central valve body, and a spring, supported by the valve stem and disposed between the plug member and the spring stop, urges the valve seating member toward the valve seat.

The valve stem is movable via a stem modulator assembly which is threadingly supported by the valve stem at an adjustable position therealong, or the valve stem can be locked to a desired position by a stem setting lock nut disposable against the stem stop portion of the support plate.

An indicia assembly is provided for visual indication of valve setting.

An object of the present invention is to provide an improved modulating flow control valve which is usable over various flow rates by selecting the dimensions of readily replaceable one component thereof.

Another object of the present invention while achieving the above stated object, is to provide a flow control valve which is economical to manufacture and repair, and which services a wide range of fluid flow rates with a minimum inventory of component parts.

Other objects, features and advantages of the present invention will be apparent from the following detailed description when read in conjunction with the drawings and appended claims.

BRIEF DESCRIPTION OF THE DRAWINGS

FIG. 2A is a top plan view thereof and FIG. 2B is a view taken at 2B—2B in FIG. 2.

FIG. 3 is a top plan view of one of the band gripping members of the cam assembly portion shown in FIG. 2; and FIG. 3A is a view taken at 3A—3A in FIG. 3.

FIG. 4 is a view of one of the two band gripping members utilized to grippingly retain the opposing end portions of the flexible band member shown in FIG. 2.

FIG. 6 illustrates another installation in which the characterizing linkage assembly of the present invention is utilized.

FIG. 7 is a side elevational view in partial cutaway detail of a modulating flow control valve constructed in accordance with the present invention.

FIG. 8 is a partial front view of the flow control valve of FIG. 7 showing the indicia plate.

FIG. 9 is an enlarged view of the valve seating member of the flow control valve of FIG. 7.

DESCRIPTION

In the following description, like numerals will be used to designate the same components of the various drawing figures.

FIGS. 1 THROUGH 5

Figure 1:
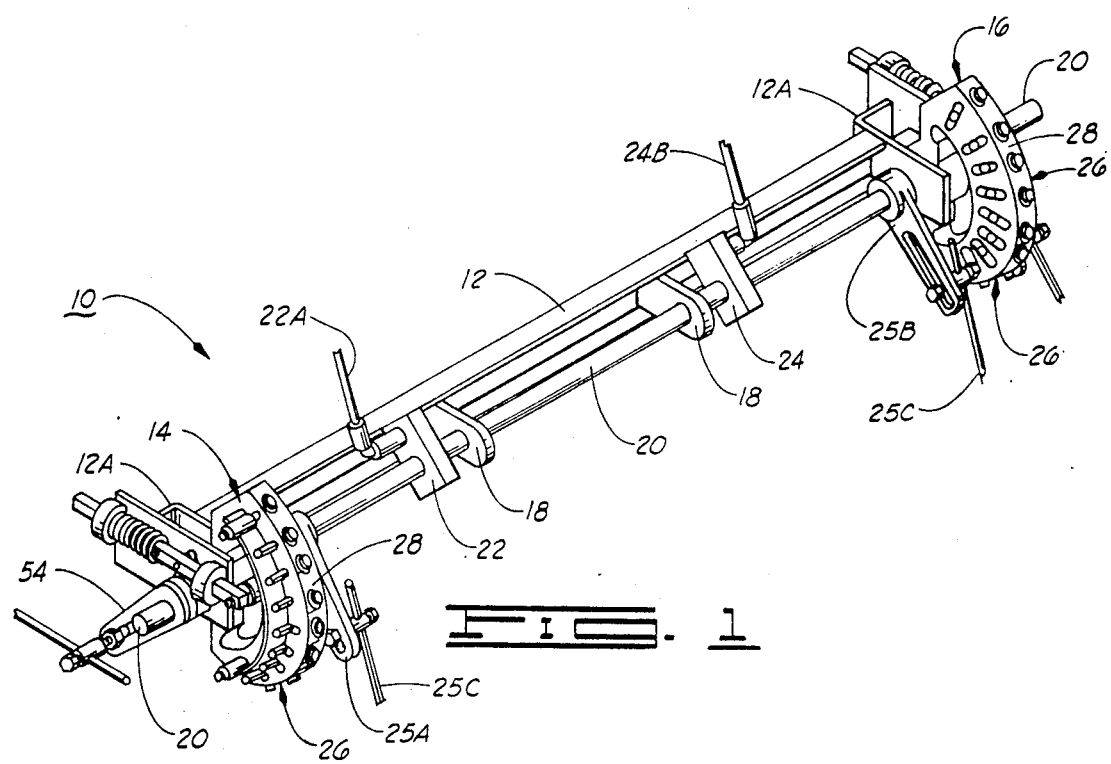
FIG. 1 is an isometric view of a characterizing linkage assembly depicted in a typical installation.

Referring to the drawings in general, and more particularly to FIG. 1, shown therein are as follows.

10 is a typical installation of a characterizing linkage assembly.

12 is a support frame which typically will be attached to a conventional burner assembly.

14 is a characterizing linkage assembly supported on one end of the support frame 12; and 16 is another characterizing linkage assembly supported on the other end of the support frame 12. While the installation 10 illustrates a pair of the characterizing linkage assemblies, it will be appreciated that the characterizing linkage assemblies can be used singularly or in any combination.

18 is a pair of support arms extensive from the support frame 12.

20 is a rotatable drive shaft bearingly supported in aligned apertures in the support arms 18.

22 and 24 are crank arms affixed to the drive shaft 20 and are connectable via connector linkages 22A and 24B to primary/secondary air control sleeves or other burner adjustments.

25A and 25B are crank arms affixed to the drive shaft 20 and connectable via connectors 25C to a conventional modulator motor, an example of which would be a control assembly which senses process parameters, such as stack free oxygen among many other parameters, and pushes or pulls the connectors 25C in a predetermined manner in response to process changes to rotate the drive shaft 20.

The characterizing linkage assemblies 14 and 16 supported at opposing ends of the support frame 12, will now be described with reference to FIGS. 2 through 5B. Since the construction of these characterizing linkage assemblies 14 and 16 are essentially identical with the minor exception of the left/right locations of outboard components thereof, it will be sufficient herein to describe one of these assemblies, with the characterizing linkage assembly 16 being arbitrarily selected. The characterizing linkage assembly 16 is shown in partial detail in the mentioned figures and comprises as follows.

26 is a cam assembly attached to near one end of the support frame 12 and comprises:

28 is a cam support member having a plurality of radially extending spaced apart radial slots 28A, and an access opening 28B.

30 is hub portion having a slotted bore 30A and tightening bolt 30B disposed in appropriately placed apertures, the lower most one of which is threaded so that the diameter of the bore 30A can be reduced once it is slipped over the drive shaft 20 to secure the hub portion 30 thereto; and 32 depicts a plurality of headed band support bolts, one for each of the radial slots 28A, and extending through apertures along the longitudinal axis of each radial slot so that each band support bolt 32 is axially disposed along one of the radial slots 28A as shown. Each band support bolt 32 is provided with a nut and spring washer 32A. Each nut 32A is locked to its band support bolt 32 with a thread locking compound. The nut 32A rotates with the bolt 32 sliding on the spring washer to retain the bolt 32 in the cam assembly 34 depicts a plurality of band gripping members, each of which is supported by one of the band support bolts 32 and is disposed in a respective radial slot A. Each of the band gripping members 34 has a body portion with a threaded aperture 34A near one end and a band engaging portion with a slot 34B at the other end. See FIGS. 3 and 3A. Each of the band gripping members is supported by one of the band support bolts 32 via its threaded aperture 34A and is positionable in its respective radial slot 28A. The band gripping members 34 can be moved along their supporting band support bolts 32 to their desired positions by rotating the band support bolts 32.

36 is a flexible band member which is supported by the band engaging portions of the band gripping members 34. The thickness of the band member 66 is selected to be grippingly engaged by the slots 34B of the band gripping members 34 as shown. The width of the band member 36 is selected so as to extend outboard of the retaining slots 34B so that the band member 36 forms an adjustable curvilinear stop band for the purpose described hereinbelow. The shape of the band member 36 is adjusted by selectively positioning the band gripping members 34 along the supporting band support bolts 32 to flex and retain the band member 36 in a desired curvilinear configuration.

The opposing ends of the band member 36 are secured by a pair of modified band gripping members, one of which is depicted in FIG. 4 and comprises as follows.

Figure 2:
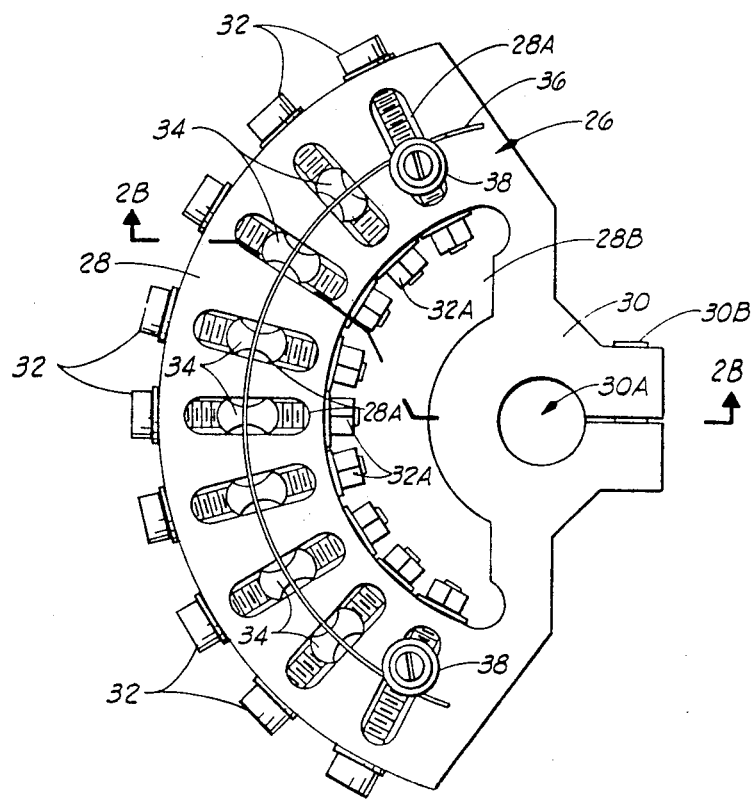
FIG. 2 is a side-elevational view of a portion of the cam assembly of the characterizing linkage assembly shown in FIG. 1.

38 in FIG. 4 depicts one of the band gripping members, such having a body portion 38A similar to the body portion of the above described band gripping members 34, which has a threaded aperture 38B supported on a bolt 32 in an end one of the radial slots 28A as shown in FIG. 2. The band gripping member 38 also has a hollow band gripping portion 38C, and a screw member 38D extensive into the hollow body portion thereof. The screw member 38D engages a threaded aperture in the end of a post portion 38E which extends into the hollow of the band gripping portion 38C. This arrangement permits the band gripping portion 38C to be rotatable on the post portion 38E with a change of angle of the flexible band member 36 while securing the band member 36 relative to the face of the cam support member 28. A slot 38F is provided through one end of the band gripping portion 38C through which one end of the band member 36 is extended. Tightening of the screw member 38D assures that the end of the band member 36 is maintained within the slot 38F while allowing the band ends to slip through the slot when the length of the band changes due to increase or decrease of the arc length.

The cam support member 28 is mounted on the drive shaft 20 and secured thereto via the bolt 30B. As the drive shaft 20 is caused to be rotated, it will be appreciated that the cam support member 28, and thus the band member 36 is caused to be rotated thereby. Since the slots 28A are radially disposed relative to the bore 30A, if the distance between the band member 36 and the center of the bore 30A is equal at each of the band gripping members 34 which grippingly retain the band member 36, the curvilinear band member 36 will circumscribed a portion of a cylindrical surface in its travel imparted by the drive shaft 20. However, with individual adjustments made to the various band gripping members 34, the flexible band member 36 can be made to have a selected curvilinear circumscription in its travel, an attribute utilized by the characterizing linkage assembly 16 for the purpose described hereinbelow.

Figure 5:
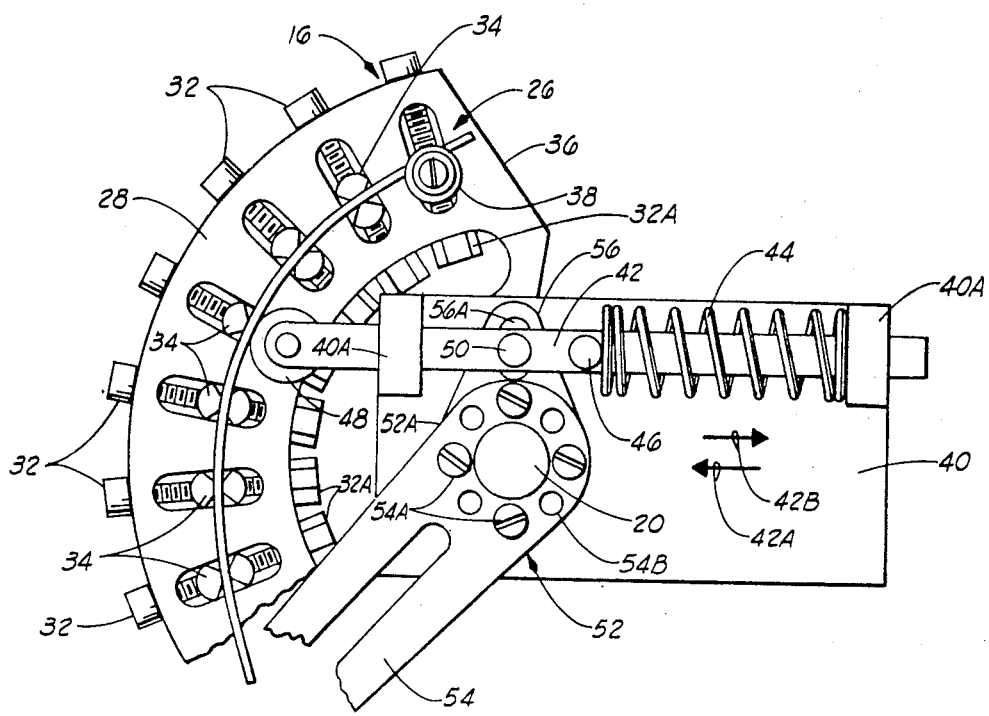
FIG. 5 is a partial, side-elevational view of the characterizing linkage assembly shown in FIG. 1.
Figure 5A:
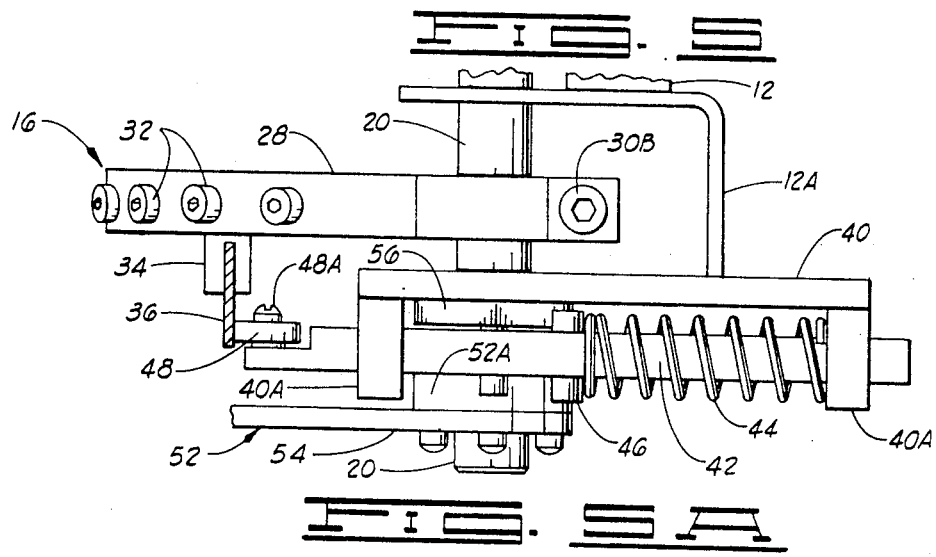
FIG. 5A is a partially detailed top plan view of a portion of the characterizing linkage assembly shown in FIG. 5.
Figure 5B:
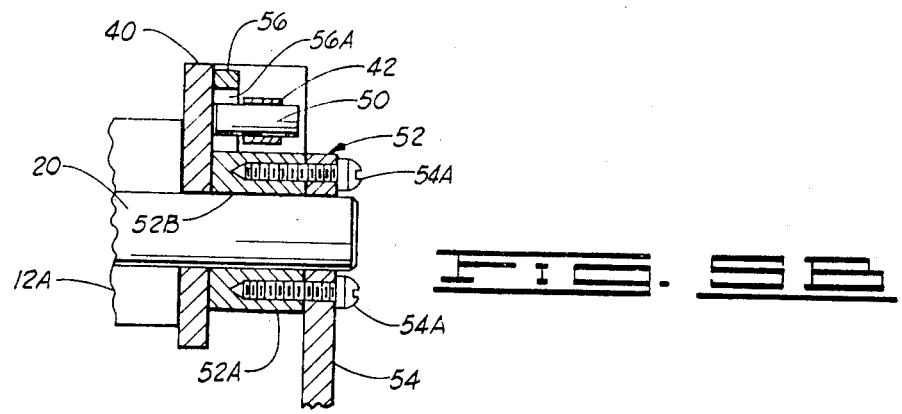
FIG. 5B is a partially cutaway front view of a portion of the characterizing linkage assembly depicted in FIG. 5.

FIGS. 5, 5A, and 5B show the details of the characterizing linkage assembly 16 as follows.

40 is another portion of the support frame 12 and comprises a support plate attached to one end thereof. A supporting end plate 12A, having an appropriately disposed drive shaft clearance bore, can be provided as shown. A clearance aperture is provided in the support plate 40 for extension of the drive shaft 20 therethrough. The support plate 40 has a pair of spaced apart tab members 40A which have a pair of axially aligned rod support apertures.

42 is a follower rod member which is slidingly supported by the rod support apertures in the support plate 40. That is, the follower rod member 42 is slidable in opposing first and second directions as depicted by the arrows 42A and 42B.

44 is a coil spring member which is disposed about the follower rod member 42.

46 is a spring retainer member which is extensive through an aperture in the follower rod member 42, and the spring member is retained between the spring retainer member 46 and one of the tab members 40A extensive from the support plate 40.

48 is a roller which is supported at the distal end of the follower rod member 42 via a screw arbor 48A and threaded aperture in a threaded portion thereof. The spring member 46 biases the follower rod member 42 in the first direction 42A and the roller 48 is restrained to be in rolling engagement with the surface of the band member 36 so that the follower rod member 42 is caused to reciprocate in the first and second directions 42A, 42B when the curvilinearity of the band member 36 is appropriately adjusted by the band gripping members 34 supported on the band support bolts 32 of the cam assembly 26.

50 is another pin member which extends through, and is retained in, an aperture in the follower rod member 42.

52 is a linkage actuator arm having a central hub portion 52A with a bore 52B. As mentioned above, the drive shaft 20 extends through an aperture in the support plate 40, and the bore 52B is sized so as to loosely receive the drive shaft 20 therethrough so that the linkage actuator arm 52 is supported by the drive shaft 20 while being independent to the rotational movement thereof.

54 is a linkage arm portion of the linkage actuator arm 52, and while the linkage actuator arm 52 can be of one piece construction, it is convenient to attach the linkage arm 54 to the central hub portion 52A via screws 54A which extend through selected holes of a circle of screw holes 54B. With the central hub portion 52A provided with circles of threaded screw holes, the angular disposition of the linkage arm 54 can be altered as desired by the meeting of these screw holes in a desired configuration and securing the linkage arm 54 to the central hub portion 52A via the screws 54A.

56 is a follower arm portion of the linkage actuator arm 52 which extends from the central hub portion 52A. The follower arm 56 has a generally longitudinal slot 56A which extends radially relative to the center of the bore 52B and is disposed to loosely receive the portion of the pin member 50 which extends from the follower rod member 42.

In order to retain the linkage actuator arm 52 on the drive shaft 20, the follower arm 56 is positioned between the follower rod member 42 and the support plate 40 with sufficient clearance to avoid interference between these components. As the follower rod member 42 is caused to be moved in the first or second directions as indicated by arrows 42A, 42B respectively, the pin member 50 causes the follower arm 56 to be moved to the left or right, which then causes the linkage arm 54 to rotate on the drive shaft 20.

Returning to FIG. 1, it will first be noted that the description of the characterizing linkage assembly 16 will also be applicable to the characterizing linkage assembly 14, both of which are disposed at opposing ends of the drive shaft 20. Therefore, the same numbers used above will depict like components of the characterizing linkage assembly 14 in FIG. 1. For convenience of claiming, the term characterizing linkage assembly will sometimes be used hereinbelow to refer to the characterizing linkage assemblies 14 and 16 in combination as shown in FIG. 1 and FIG. 6.

FIG. 6

Turning to FIG. 6, and again using the same numerals as above for like components, shown therein are the characterizing linkage assemblies 14 and 16 connected to opposing ends of the drive shaft 20. However, in the application depicted in FIG. 6, shown therein is:

58 is a motor control unit which supports the drive shaft 20 and which imparts responsive rotary movement to the drive shaft 20. The motor control unit 58 shown may be, by way of example, a Modutrol motor control manufactured by Honeywell Corporation of Minneapolis, Minn. Modutrol is a trademark of that company and is the name of a product which contains at least one electronic transducer and a modulator motor for imparting rotational energy to the drive shaft 20 in response to analyzed data received from the controlled process. For example, in an industrial combustion application, if the air and fuel mixture is not proper, or changes from an optimum setting, or a change in boiler load is called for, the drive shaft 20 is caused to be rotated, which in turn causes the linkage arm 54 of the linkage actuator arm 52 to be rotated. The linkage arm 54 of the characterizing linkage assemblies 14, 16 can be connected to the louvers of an intake air conduit or to a fuel valve. Normally, the characterizing linkage assemblies 14 and 16 are connected to fuel valves, with one being a gas fuel valve and the other being an oil fuel valve, and the air intake is driven by another linkage. Since the shape of the flexible band member of each of the characterizing linkage assemblies 14 and 16 can be independently configured to a desired curvilinear arc, the characterizing linkage assemblies 14 and 16, while acted on simultaneously by the same drive shaft 20, can be caused to respond in the movement of their respective linkage arms 54 independently to each other.

The operation of the characterizing linkage assemblies 14 and 16 will have become clear from the above description. It will be pointed out that the characterizing linkage assembly described hereinabove offers a number of advantages over the prior art in that a high degree of response movement of the linkage arm 54 is achieved while minimizing the number of components and weight thereof, resulting in a low inertia assembly which can be made with relatively quick rotational reversals. Also, the components are of relatively simple and open design, thereby affording constant access for visual inspection and repair.

FIGS. 7 THROUGH 9

Turning now to FIG. 7, shown therein is a flow control valve which is usable with the above described characterizing linkage assembly 14. As depicted in FIG. 7 and subsequent figures, the following component designations are applicable.

60 refers to the flow control valve.

62 is a central valve body having a lower inlet end 62A, an upper most end 62B and a side outlet port portion 62C. Each of the inlet end 62A, upper end 62B and outlet port portion 62C has an internally threaded bore that communicates with a hollow bore 62D internal to the central valve body 62, the bore at the inlet end 62A forming an inlet port and the bore at the upper end 62B forming a body access port;

64 is a removable, tubular bottom body portion having a threaded upper end 64A, a threaded lower end 64B and an internal bore 64C which, when the upper end 64A is screwed into the threaded lower end of the inlet end 62A of the valve body 62, communicates with the internal bore 62D. The inner walls of the body portion 64 are tapered so that the upper portion of the internal bore 64C forms an upwardly converging passageway as shown, and a valve seat 64D, preferably having a cylindrically shaped surface, is formed at the upper most end 62B of the central valve body 62.

65A and 65B are arrows indicating the direction of fluid flow through the tubular bottom body portion 64 and the central valve body 62.

66 is a plug member having a threaded end 66A which seals the upper end 62B of the central valve body 62. The plug member 66 has a centrally disposed bore 66B which has a cup seal member 66C disposed in an appropriately located groove in the wall of the bore 66B.

68 is a valve stem having a lower end 68A extensive through the bore 66B of the plug member 66 and extensive into the internal bore 62D of the central valve body 62. The valve stem 68 has a narrowed upper portion 68B which is threaded along a substantial distal end portion thereof.

70 is an indicator pin which is supported by the valve stem 68 and extensive laterally thereto, preferably via a support end which is disposed in an appropriately sized bore through the valve stem 68 to securely retain the indicator pin 70 as shown. The indicator pin 70 serves two purposes. First, the indicator pin 70 assures proper rotational alignment of the valve stem 68, and secondly, it indicates the position of the valve stem relative to a fixed point so as to provide a visual indicia of valve setting and travel.

72 is a support plate which is supported by the plug member 66 and which has a stem stop portion 72A extensive laterally from its distal end. The stem stop portion 72A has a stem clearance bore 72B through which the threaded upper portion 68B of the valve stem 68 extends. Also, the support plate 72 has a longitudinal slot 72C extending along its front face.

74 is a stem setting nut which is retained on the threaded portion 68B of the valve stem 68, and a washer 74A is provided between the stem setting nut 74 and the stem stop portion 72A.

76 is a stem modulator assembly which comprises an L-shaped stem mover member 76A having a laterally extending leg 76B. The leg 76B has a stem clearance bore (not shown) through which the upper portion 68B of the valve stem 68 extends, and a pair of locking nuts 76C locks the stem mover member 76A at a desired position along the upper valve stem portion 68B.

78 is a roller portion of the stem modulator assembly 76 and has an arbor support 78A extensive through a bore (not shown) in the upper end portion of the stem mover member 76A, and a pair of lock nuts 78B locks the roller 78 to the stem mover member 76A.

As shown in FIG. 7, the outside portion of the flexible band member 36 of the characterizing linkage assembly 14 is spatially received beneath the roller 78 to serve as a guide for same in the manner and purpose described further hereinbelow. Returning to a description of the valve stem 68, and continuing with FIG. 7, it will be noted that the following additional details are provided.

80 is an enlarged portion of the valve stem 68 at its lower end and serves as a spring stop portion. A threaded bore 80A is provided in the lower face of the spring stop portion 80 as shown.

82 is a valve seating member having a threaded arbor portion 82A which is threadingly engaged with the bore 80A for supporting the valve seating member 82 so as to extend into the bore 64C of the tubular bottom body portion 64 and to matingly seat with the valve seat 64D in a closed position of the flow control valve 60. The valve seating member 82 has a valve seating portion 82B which has a straight needle zone 82C and a tapered seating zone 82D. That is, the needle zone 82C of the valve seating member 82 is an elongated, substantially cylindrical-shaped member forming a lower portion of the valve seating member 82; and the tapered seating zone 82D of the valve seating member 82 is an upwardly diverging member having an inverted frusto-conical configuration (substantially as shown) forming an upper portion of the valve seating member 82. The needle zone 82C has a diameter D.

83 is a spring compressingly disposed about the lower end 68A of the valve stem 68 between the spring stop portion 80 and the plug member 66, the spring 83 serving to bias the valve stem 68 toward the valve seat 64D of the tubular bottom body portion 64.

FIG. 8 is a front view of the support plate 72 to show the following details thereof.

84 is an indicia plate which has a plurality of mounting slots 84A by which screws 84B attach the indicia plate 84 to the support plate 72 by appropriately disposed threaded bores therein. Disposed on the indicia plate 84 is an indicia set of spaced line indicators 84C. The indicia set 84C can be screened directly onto the thin indicia plate 84 or can be supplied via a printed applique which is adhesively mounted to the indicia plate 84. A slot 84D is provided in the indicia plate 84, and the indicia plate 84 is selectively dimensioned so as to cover the slot 72C of the support plate 72 except for the area left open by the slot 84D, with the slot 84D receiving the distal end of the indicator pin 70 to permit unrestricted travel of the indicator pin 70 therein while preventing unwanted rotation of the valve stem 68. That is, the confinement of the indicator pin 70 to only vertical travel in the slot 84D assures proper alignment of the roller 78 on the track of the flexible band member 36.

86 is an indicating pointer attached to the outer end of the indicator pin 70 and is disposed to clearingly overlay the indicia set 84C to provide a numeric or percentage visual indication for the position of the valve stem 68 and thus an indication of the setting of the valve seating member 82.

Turning now to FIG. 9, an enlarged view of the valve seating member 82 is shown. As noted, the valve seating member 82 is detachable from the valve stem 68 and is therefore replaceable with similar members of varying dimensions. By varying the diameter D of the straight needle zone 82C, for a fixed diameter of the cylindrical valve seat 64D, the flow area of the valve seat will be restricted and the flow rate of the fluid permitted through the annulus between the straight zone portion 82C and the valve seat 64D will reach a predetermined maximum valve, while the angularity of the tapered zone 82D will determine the size of such annular flow as the valve seating member 82 is caused to be positioned in near proximity to the valve seat 64D. An important feature of the present invention is that the tubular bottom portion 64 can be replaced with other similar members having needle zones with differing valves of the diameter D which extend into valve seat 64D to predetermine the maximum flow rate therethrough as desired for a particular installation. And if desired, the tubular bottom body portion 64 can be changed as necessary to provide a predetermined dimension for the internal diameter of the valve seat 64D.

The flow control valve 60 is operationally controllable by the characterizing linkage assembly 14. Once mounted by conventional support brackets in a position relative to the characterizing linkage assembly 14 such that the band member 36 thereof is disposed in rolling engagement with the roller 78, it will be appreciated that actuation of the characterizing linkage assembly 14 in the manner described hereinabove will cause the stem modulator assembly 76 to raise or lower the valve stem 68 as the arc of the band member 36 is established. Of course, the valve stem 68 can as well be modulated by other mechanisms that cause the raising or lowering of the valve stem via the stem modulator assembly 76 in response to variations in a selected process parameter, and the operation of the flow control valve 60 will be as well suited to respond as described further hereinbelow.

Since the spring 83 is disposed to bias the valve stem downwardly (that is, toward the valve seat 64D), force exerted in the countering direction against the spring 83 will serve to move the valve stem 68 (and thus the tapered valve member 82) to open the valve seat 64D, and upon relaxing the stem modulator assembly 76, the spring 83 will move the valve stem 68 (and thus the valve seating member 82) to restrict or close the valve seat 64D. This arrangement provides a distinct advantage over known prior art modulator control valves in that the operational torque required in such prior art valves increases with fluid pressure encountered by the valve, while the opposite is true of the present invention. Increased fluid pressure in the bore 64C of the bottom body portion 64 increases the force on the valve seating member 82, thereby decreasing the torque required to lift the valve stem 68 at elevated pressures.

If the valve stem 68 is to be adjusted to a fixed position, or if the tapered valve member is to be permitted only partial closure, the valve stem 68 can be set via the stem setting nut 74 on the upper portion 68B of the valve stem 68 at any desired point therealong.

The flow control valve of the present invention offers a number of advantages, of which are the following. Because the valve stem 68 is biased in a closed position, this presents a fail safe design as the spring 83 will close the flow control valve 60 in the event of a failure. Further, flow control is possible over a very large range of flow rates with an appropriate combination of valve seat 64D sizing and sizing of the tapered valve member 82. With the provision of variously sized tapered valve members 82, use the one necessary to accommodate a desired flow range can be installed quickly into the flow control valve 60, and this can be achieved without fluid piping disconnecting or adjustment of volume range change.

Further, the percent flow indicator, that is the indicia plate 84, is adjustable operation of the valve for a minimum or fixed flow rate.

Of course, the range of pressures that can be accommodated by the flow control valve 60 can be made available over a large pressure range by simple component design and interchangeability of parts.

As note above, the flow control valve 60 is operable by other mechanisms, such as by a cam arm, cam roller or a diaphragm (that is, a bleeding orifice) control.

The design of the flow control valve 60 is simple and economical to manufacture, has no packing gland which needs to be adjusted, and it can be fabricated of materials as required.

It is clear that the present invention is well adapted to carry out the objects and to attain the ends and advantages as well as those inherent therein. While presenting prepared embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A modulating flow control valve responsive to actuation of a characterizing linkage assembly, comprising:
 a central valve body having an internal bore and having an inlet port, an outlet port and a body access port;
 a tubular body member removably supported by the central valve body at the inlet port, the inner walls of the body member being tapered so that an upper portion of the internal bore defines an upwardly converging passageway, the uppermost end of the tubular body member providing a valve seat therein;

a plug member removably supported by the central valve body in the body access port and having a bore therethrough communicating with the internal bore of the central valve body;

stem means for selectively restricting the valve seat in the inlet port, the stem means comprising:

a valve stem extensive through the bore of the plug member and having a spring stop portion disposed in the internal bore of the central valve body;

valve means removably supported by the spring stop portion of the valve stem for selectively restricting the valve seat of the tubular body member, the valve member comprising a valve seating member forming an upper portion of the valve means and a needle zone forming a lower portion of the valve means, the valve seating member having an inverted frusto-conical shaped configuration for matingly engaging the valve seat for sealing same, the needle zone having a substantially elongated, cylindrical-shaped configuration, the needle zone having a diameter selected to provide a predetermined flow rate when disposed in the valve seat;

spring means disposed between the spring stop and the plug member for biasing the valve means toward the valve seat; and stem modulator means in motor engagement with and responsive to the characterizing linkage assembly and cooperating with the spring means for moving the valve stem relative to the valve seat so that the valve means supported thereby selectively opens and closes the tubular body member to fluid flow.

2. The flow control valve of claim 1 further comprising:

indicia means for indicating the percentage of fluid flow relative to positioning of the valve stem.

3. The flow control valve of claim 2 further comprising:

stem setting means for locking the valve stem in a selected travel location to achieve a desired flow rate setting.

4. The flow control valve of claim 3 wherein the stem setting means comprises:

a support plate supported by the plug member and having a stem stop portion which has a stem clearance bore through which an upper end of the valve stem extends; and wherein the stem setting means comprises a lock nut threadingly supported on a threaded portion of the valve stem upper end, the lock nut disposable against the stem stop portion to counter the spring means.

5. The flow control valve of claim 4 wherein the indicia means comprises:

an indicator pin having a indicating pointer at one end and supported by the valve stem at its other end and extensive laterally thereto; and an indicia plate removably supported by the support plate, the indicia plate having an indicia set displayed thereon, the indicating pointer supported to clearingly overly the indicia set so as to provide visual indication of valve stem setting.

6. The flow control valve of claim 5 wherein the stem modulator means comprises:

an L-shaped stem mover member having a laterally extending leg with a stem clearance bore through which the upper portion of the valve stem is extensive;

a pair of lock nuts supported by the threaded portion of the valve stem upper end and disposable thereon to lock the valve stem to the laterally extending leg of the stem mover member; and means for engaging the characterizing linkage assembly for imparting movement to the valve stem in cooperation with the spring means.

* * * * *

UNITED STATES PATENT AND TRADEMARK OFFICE
CERTIFICATE OF CORRECTION

PATENT NO. : 4,782,856  Page 1 of 2

DATED : November 8, 1988

INVENTOR(S) : George H. Siedhoff

It is certified that error appears in the above-identified patent and that said Letters Patent is hereby corrected as shown below:

Column 1, line 57, change "screw" to --screws--;

Column 4, line 24, after "assembly" insert --26.-- and delete "34";

Column 4, line 25, before "depicts" start a new paragraph and insert --34--;

Column 4, line 27, delete "A." after "slot" and substitute --28A.-- therefor;

Column 4, line 31, after "members" and before "is" insert --34--;

Column 4, line 40, delete "66" and substitute --36-- therefor;

Column 5, line 19, change "cumscribed" to --cumscribe--;

Column 11, line 14 (claim 1), change "member" to --means--; and

UNITED STATES PATENT AND TRADEMARK OFFICE
CERTIFICATE OF CORRECTION

PATENT NO. : 4,782,856

DATED : November 8, 1988

INVENTOR(S) : George H. Siedhoff

It is certified that error appears in the above-identified patent and that said Letters Patent is hereby corrected as shown below:

Column 12, line 24 (claim 6), change "overly" to
--overlie--.

Signed and Sealed this

Sixteenth Day of April, 1991

Attest:

HARRY F. MANBECK, JR.

*Attesting Officer*  *Commissioner of Patents and Trademarks*